(12) United States Patent
Zinbo et al.

(10) Patent No.: US 7,341,792 B2
(45) Date of Patent: Mar. 11, 2008

(54) BIAXIALLY ORIENTED SATURATED POLYESTER FILM, METHOD OF MAKING THE SAME, LAMINATE OF BIAXIALLY ORIENTED SATURATED POLYESTER FILM AND METHOD OF MAKING THE SAME

(75) Inventors: Takeshi Zinbo, Mie (JP); Miya Minamigawa, Mie (JP)

(73) Assignee: AMT Laboratory Corporation, Mie (JP)

( * ) Notice: Subject to any disclaimer, the term of this patent is extended or adjusted under 35 U.S.C. 154(b) by 421 days.

(21) Appl. No.: 10/920,443

(22) Filed: Aug. 18, 2004

(65) Prior Publication Data

US 2005/0079344 A1    Apr. 14, 2005

(30) Foreign Application Priority Data

Aug. 21, 2003    (JP)    ............................. 2003-297385

(51) Int. Cl.
B32B 27/08    (2006.01)
B32B 27/36    (2006.01)
B29C 7/04    (2006.01)

(52) U.S. Cl. ...................... 428/480; 428/910; 528/308; 427/532; 427/533; 427/535; 427/536; 427/539

(58) Field of Classification Search ...................... None
See application file for complete search history.

(56) References Cited

U.S. PATENT DOCUMENTS 3,950,206 A * 4/1976 Adachi et al. ........... 156/272.6

| | | |
|---|---|---|
| 4,772,348 A | 9/1988 | Hirokawa et al. ........ 156/272.6 |
| 5,747,174 A * | 5/1998 | Kimura et al. .............. 428/480 |
| 5,955,181 A * | 9/1999 | Peiffer et al. ............... 428/212 |
| 6,514,597 B1 * | 2/2003 | Strobel et al. .............. 428/167 |
| 6,576,313 B2 * | 6/2003 | Iio et al. .................. 428/36.91 |
| 6,585,920 B1 * | 7/2003 | Strobel et al. ................ 264/80 |

FOREIGN PATENT DOCUMENTS

EP    0 644 032    *    3/1995

(Continued)

OTHER PUBLICATIONS

Schimtz, Peter et al., "Films." Ullmann's Encyclopedia of Industrial Chemistry, 5th Ed., vol. A11 (1988), pp. 85-95, 105-06, 108-110.*

(Continued)

*Primary Examiner*—Vivian Chen
(74) *Attorney, Agent, or Firm*—Smith, Gambrell & Russell, LLP

(57) ABSTRACT

A biaxially oriented saturated polyester film made by a biaxial orientation method, includes a heat-seal side formed in at least one of two sides of the film, the heat-seal side being made by applying a low-temperature plasma treatment to a film surface so that the film surface has a composition ratio of the number of oxygen atoms to the number of carbon atoms, the composition ratio being not less than 105% and not more than 115% of a theoretical value and so that the heat-seal side is heat sealable at a heating temperature ranging from 100° C. to 200° C.

2 Claims, 1 Drawing Sheet

FOREIGN PATENT DOCUMENTS

| | | | |
|---|---|---|---|
| EP | 0 668 144 A2 | | 8/1995 |
| EP | 0 698 484 | * | 2/1996 |
| JP | 62214941 | | 9/1987 |
| JP | 63-281416 | * | 11/1988 |
| JP | 04-222842 | * | 8/1992 |
| JP | 08-230115 | * | 9/1996 |
| WO | WO 02/090112 A1 | | 11/2002 |

OTHER PUBLICATIONS

Ben D. Beake, et al., "Correlation of friction, adhesion, wettability and surface chemistry after argon plasma treatment of poly (ethylene terephthalate)," Journal of Materials Chemistry, Oct. 12, 1998, vol. 8, pp. 2845-2854.

\* cited by examiner

BIAXIALLY ORIENTED SATURATED POLYESTER FILM, METHOD OF MAKING THE SAME, LAMINATE OF BIAXIALLY ORIENTED SATURATED POLYESTER FILM AND METHOD OF MAKING THE SAME

BACKGROUND OF THE INVENTION

1. Field of the invention

This invention relates to a biaxially oriented saturated polyester film with heat seal, a method of making the same, a laminate using the biaxially oriented saturated polyester film and a method of making the same.

2. Description of the related art

A biaxially oriented saturated polyester film such as saturated polyethylene terephthalate (hereinafter referred to as "PET") has various superior characteristics and is accordingly used in various fields. For example, the biaxially oriented saturated polyester film is used for wrapping food or the like because of its high transparency, small permeability and high safety and sanitation. Furthermore, the biaxially oriented saturated polyester film is used as a material for capacitors because of its toughness and superior electric characteristics, as well known in the art.

However, molecules of the biaxially oriented saturated polyester film are oriented and crystallized during orientation though the biaxially oriented saturated polyester film has superior characteristics as described above. As a result, a sheet of biaxially oriented saturated polyester film cannot be heat-sealed directly with another sheet of biaxially oriented saturated polyester film, different type of film or metal foil at or below a melting point of the biaxially oriented saturated polyester film (at or below 256° C. in PET, for example). Thus, PET has no heat sealability as well known in the art. In view of this problem, the prior art has proposed provision of a heat-seal layer made by coating a copolymer of polyester resin on one side of a PET film and having a thickness of about 1 μm so that the PET film may have a heat sealability in the use of a food wrapping film. This is described on page 40, "Convertech," published in September 2002 by Converting Technical Institute, Tokyo.

"Convertech" published in May 2003 by Converting Technical Institute further proposes alternative method (page 68, TABLE 3). In the proposed method, a polybutadiene or urethane anchor coat is applied to the PET film and thereafter, an aluminum foil is bonded to the PET film using LDPE (low density polyethylene) with heat-sealability. Furthermore, JP-B-3-19052 discloses further another method in which a surface of the PET film is plasma-treated at a low temperature and a heat-sealable bonding agent layer is then provided so that the PET films are heated or the PET film is heated together with a metal, aluminum foil or polycarbonate or the like so as to be heated and pressed thereby to be laminated.

However, the above-described prior art methods each necessitate provision of the bonding layer comprising different types of materials on the PET film in order that the PET film may have heat-sealability. In this case, since a bonding agent containing an organic solvent is generally used, the solvent needs to be recovered at a drying step for the purpose of air pollution control. Furthermore, this type of plastic material is desired to be recovered after use to be recycled as a resin material. However, the fact that different types of resin layers are on the PET film prevents the recycle.

In the manufacture of the PET film by a biaxial orientation, an obtained upper limit of a thickness of the PET film is 125 μm at best. Although the thickness of the manufactured PET film could be increased to a range from 350 to 500 μm, the differences in the thickness of the PET film is increased. In view of this problem, non-orientation methods or die-forming methods are carried out when thick plate-shaped products to be manufactured include the PET films with thicknesses of 0.5 mm, 1.0 mm and 2.0 mm respectively. However, plates of PET manufactured by these methods have low heat-resistance (about 100° C.) and extremely low physical strength, whereupon the PET plates cannot be put to practical use. Accordingly, a range of usage of the PET plates will be widened if the PET plates can be manufactured by the biaxial orientation method.

SUMMARY OF THE INVENTION

Therefore, an object of the present invention is to provide a biaxially oriented saturated polyester film which can be heat-sealed with same type of film, metal foils or different types of plastic films at or below its melting point and a method of making the same.

Another object of the invention is to provide a laminate using the foregoing biaxially oriented saturated polyester film and capable of being pasted together without using a bonding agent, and a method of making the same.

It is known in the prior art that since molecules of the biaxially oriented saturated polyester film are oriented and crystallized during orientation, a sheet of biaxially oriented saturated polyester film cannot be heat-sealed directly with another sheet of film, different type of film or metallic foil at or below a melting point of the biaxially oriented saturated polyester film. On the other hand, the inventors conducted various experiments and made researches in order to provide the biaxially oriented saturated polyester film with heat sealability. As a result, the inventors found that a low-temperature plasma treatment was applied to the surface of the biaxially oriented saturated polyester film so that the film surface was refined, whereupon the film was able to be provided with heat sealability at a relatively lower temperature lower than the melting point. Thus, the present invention was made.

The present invention provides a biaxially oriented saturated polyester film made by a biaxial orientation method, comprising a heat-seal side provided on at least one of two sides thereof, said heat-seal side being made by applying a low-temperature plasma treatment to a film surface so that the film surface has a composition ratio of the number of oxygen atoms to the number of carbon atoms, the ratio being not less than 105% and not more than 115% of a theoretical value and so that said heat-seal side is heat sealable at a heating temperature ranging from 100° C. to 200° C.

When the low-temperature plasma treatment is carried out, oxygen atoms are introduced into the film surface, or more specifically, a COOH group or OH group is added to the film surface. Consequently, it is conjectured that the biaxially oriented saturated polyester film, which generally has no heat sealability, is provided with heat sealability at a heating temperature ranging from 100° C. to 200° C. The low-temperature plasma treatment may only be applied to at least one of two sides of the film to be stuck but may be applied to both sides of the film. When one side of the film is stuck, the side to which the low-temperature plasma treatment has been applied serves as a heat sealed side, and both sides of the film serve as heat sealed sides.

In the present invention, the heat-seal side has a composition ratio of an oxygen atom to a carbon atom which ranges from 2.5% to 20% and is larger than a theoretical value.

Consequently, a desired heat sealability can be achieved. The composition ratio (O/C) herein refers to a ratio of the number of oxygen atoms (O) to the number of carbon atoms (C) both of which numbers have been obtained by measuring the film surface by an X-ray electron spectroscopy method (XPS). Furthermore, the theoretical value refers to the one in the resin composition composing the film. For example, since the theoretical value is $(C_{10}O_4H_8)n$ in the case of PET, the theoretical value of the composition ratio is obtained as 4/10=0.4. A small amount of hydrocarbon is usually adherent to the surface of this type of film and accordingly, an actually measured value is considered to be smaller than the theoretical value.

The research made by the inventors reveals that the aforesaid composition ratio (O/C) is larger than the theoretical value in a range from 2.5% to 20%, that is, a desirable heat sealability can be achieved in the range from 102.5% to 120% of the theoretical value. More preferably, a more desirable heat sealability can be achieved when the composition ratio is not less than 105% and not more than 115%. Furthermore, a desirable heat sealability cannot be obtained when the composition ratio is less than 102.5% of the theoretical value or when the composition ratio exceeds 120% of the theoretical value.

The present invention also provides a method of making a biaxially oriented saturated polyester film which is heat-sealable at a heating temperature ranging from 100° C. to 200° C., the method comprising making a film from a saturated polyester resin as a principal material by a biaxial orientation; and applying a low-temperature plasma treatment to a surface of the film using a low-temperature plasma treating machine of an internal electrode type. Consequently, the axially oriented saturated polyester film can readily be obtained which has a heat sealability at a relatively lower temperature than the melting point.

The biaxially oriented saturated polyester film of the present invention is a film obtained by biaxially orienting a straight chain thermoplastic polymer with ester linkage as a main chain. Such a typical polymer includes PET, polyethylene naphthalate (PEN) and polybutadiene terephthalate (PBT). In this case, the film may or may not contain copolymeric composition, an additive, for example, for improving characteristics (organic or inorganic filler etc.), plasticizer and/or the like.

The present invention further provides a laminate comprising a biaxially oriented saturated polyester film having a film surface to which a low-temperature plasma treatment is applied so that the biaxially oriented saturated polyester film is heat sealable at a heating temperature ranging from 100° C. to 200° C., and a material of a type different from the biaxially oriented saturated polyester film, stuck on the biaxially oriented saturated polyester film by heat seal. In this case, the biaxially oriented saturated polyester film has a heat-seal side having a composition ratio of an oxygen atom to a carbon atom which ranges from 2.5% to 20% and is larger than a theoretical value. Furthermore, the material of the different type includes a metal foil, glass, ceramics, graphite or different types of plastic films.

The above-described biaxially oriented saturated polyester film has a heat sealability at a relatively lower temperature than the melting point. Accordingly, the film and another type of material can be stuck to each other at a relatively lower heating temperature ranging from 100° C. to 200° C. without using any bonding agent. Since no bonding agent of organic solvent type is required, no equipment nor steps to recover the solvent for the purpose of environment protection are required. Further, the film can recovered and reproduced more easily. The laminate can be utilized for various purposes including a wrapping purpose.

The invention further provides a laminate comprising a plurality of sheets of biaxially oriented saturated polyester films each having a film surface to which a low-temperature plasma treatment is applied so that each biaxially oriented saturated polyester film is heat sealable at a heating temperature ranging from 100° C. to 200° C., said sheets of biaxially oriented saturated polyester films being stuck on each other by heat seal. In this case, too, each sheet of biaxially oriented saturated polyester film has a heat-seal side having a composition ratio of an oxygen atom to a carbon atom which ranges from 2.5% to 20% and is larger than a theoretical value.

The above-described biaxially oriented saturated polyester film has a heat sealability at a relatively lower temperature than the melting point. Accordingly, a plurality of films can be stuck to each other at a relatively lower heating temperature ranging from 100° C. to 200° C. without using any bonding agent. Since no bonding agent of organic solvent type is required, no equipment nor steps to recover the solvent for the purpose of environment protection are required. Further, the film can recovered and reproduced more easily. Additionally, when a large number of films produced by the biaxial orientation method are stuck together, a thick plate of biaxially oriented saturated polyester resin can be obtained. In this case, the thick plate has a sufficient heat resistance and high physical strength.

The invention still further provides a method of making a laminate of a biaxially oriented saturated polyester film made by a biaxial orientation method and a material of a type different from the biaxially oriented saturated polyester film, both being laminated together, the making method comprising making a film from a saturated polyester resin as a principal material by a biaxial orientation, applying a low-temperature plasma treatment to a surface of the film using a low-temperature plasma treating machine of an internal electrode type so that the biaxially oriented saturated polyester film is heat sealable at a heating temperature ranging from 100° C. to 200° C., and heat-sealing the film and the different material together by heat press or heat roll.

The invention yet still further provides a method of making a laminate made by laminating a plurality of sheets of biaxially oriented saturated polyester films each made by a biaxial orientation, the method comprising making a film from a saturated polyester resin as a principal material by a biaxial orientation, applying a low-temperature plasma treatment to a surface of the film using a low-temperature plasma processor of an internal electrode type so that the biaxially oriented saturated polyester film is heat sealable at a heating temperature ranging from 100° C. to 200° C., and heat-sealing the films by heat press or heat roll.

In each of the above-described methods, each of the foregoing laminates can be produced readily. For the purpose of improvement in the bonding strength, a surface treatment (corona treatment or the like) may be applied to or a surface treated layer may be provided on a counterpart different type of material (metal foil or different type of plastic film) or a surface of the same type of film (stuck surface) in stacking the laminates together. A rust preventing process may also be applied in the case of metal foil.

BRIEF DESCRIPTION OF THE DRAWINGS

Other objects, features and advantages of the present invention will become clear upon reviewing the following description of embodiment with reference to the accompanying drawings, in which FIGURE is a schematic longitudinal section of a low-temperature plasma treating machine, showing one embodiment in accordance with the present invention.

DETAILED DESCRIPTION OF THE INVENTION

Figure 1:
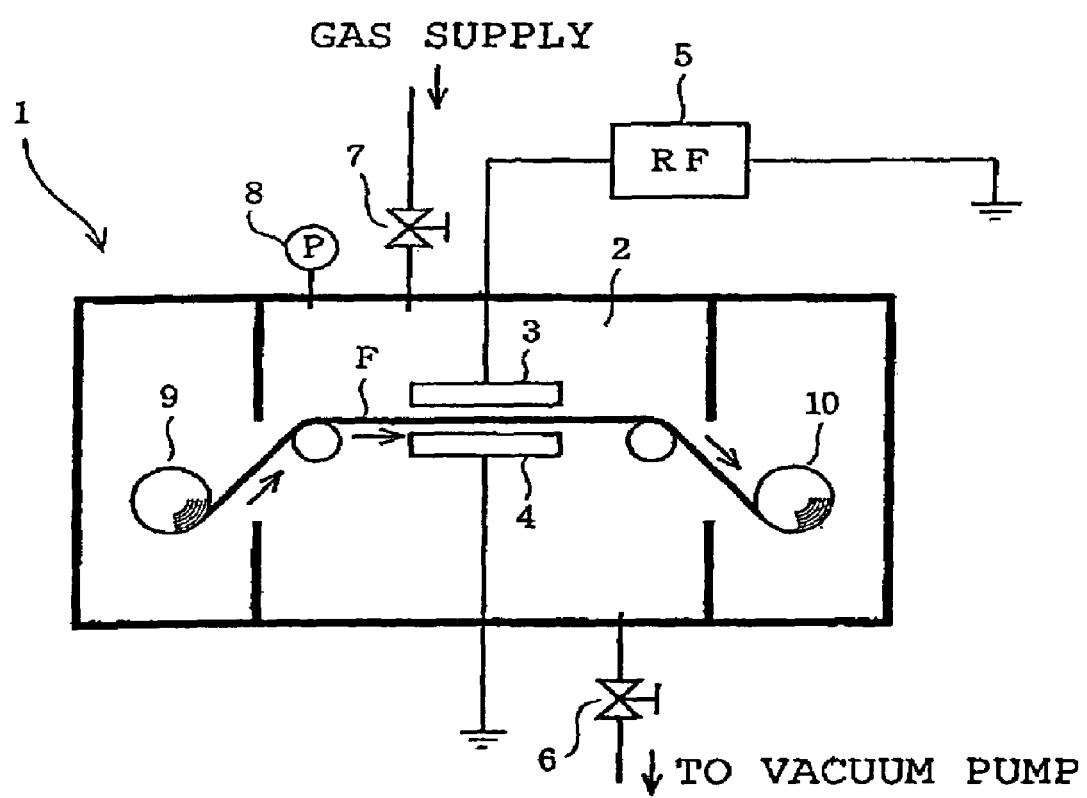

One embodiment of the present invention will be described with reference to the FIGURE. As shown in TABLE which will be described in detail later, examples 1 to 9 represent the biaxially oriented saturated polyester films made in accordance with the present invention. In each example, the film has a surface processed by a low-temperature plasma treatment. Consequently, each film is heat sealable at a heating temperature ranging from 100° C. to 200° C. The biaxially oriented saturated polyester film of each of the examples 1 to 9 has a composition ratio of an oxygen atom (O) to a carbon atom (C) which ranges from 2.5 % to 20% and is larger than a theoretical value.

More specifically, in examples 1 to 8, respective one sides g.(stuck sides) of biaxial oriented PET films each having a thickness of 100 μm (a product under the trademark, "Lumirror" by Toray Industries Inc.) is processed by a low-temperature plasma treating machine of inner electrode type under different conditions. In example 9, one side (stuck side) of a biaxial oriented PET film having a thickness of 100 μm (a product under the trademark, "Teonex" by Teijin DuPont Films) is also processed by a low-temperature plasma treating machine of inner electrode type.

FIGURE typically illustrates the low-temperature plasma treatment under execution by a low-temperature plasma treating machine 1. The low-temperature plasma treating machine treating machine 1 includes a closed treatment chamber 2. An upper electrode 3 and a lower electrode 4 are disposed in the closed treatment chamber 2. A high-frequency power source 5 is connected to the upper electrode 3 whereas the lower electrode 4 is grounded. An atmospheric pressure in the treatment chamber 2 is reduced by opening a valve 6 connected to a vacuum pump (not shown). Further, when a valve 7 connected to a gas supply (not shown), a treatment gas is supplied into the chamber 2. A pressure gauge 8 is provided for measuring the atmospheric pressure in the chamber 2.

An unprocessed film F is made from a saturated polyester resin as a main material by a biaxial orientation method using a forming machine (not shown) so that the film has a predetermined width and thickness. The film is wound into a roll. The film F is set on a support section 9 of the low-temperature plasma treating machine 1. The film F is drawn out of the supply section 9 and caused to pass through a space between the upper and lower electrodes 3 and 4 for the plasma treatment. After execution of the plasma treatment, the film F is then re-wound in a winding section 10. Although the low-temperature plasma treatment is applied only to one side of the film F in the embodiment, both sides of the film F may be processed by the low-temperature plasma treatment.

As the result of execution of the low-temperature plasma treatment, a film of example 1 has a film surface (a heat-sealed side) treated by the low-temperature plasma treatment. The film surface has a surface composition ratio X (O/C) which is 102.5% of a theoretical value. A film of example 2 has a surface composition ratio X (O/C) which is 104.8% of the theoretical value. A film of example 3 has a surface composition ratio X (O/C) which is 107.5% of the theoretical value. A film of each of examples 4, 6, 7 and 8 has a surface composition ratio X (O/C) which is 112.5% of the theoretical value. A film of example 5 has a surface composition ratio X (O/C) which is 120.0% of the theoretical value. A film of example 9 has a surface composition ratio X (O/C) which is 105.0% of the theoretical value.

An adherend is stuck to each of the films of examples 1 to 9 by heat seal (without using any bonding agent) thereby to be made into a laminate. More specifically, in the films of examples 1 to 5 and 9, each film and a film equivalent to each film are stuck together with the equivalent film serving as an adherend. Regarding example 6, a biaxially oriented PET film (having a surface composition ratio X of 95.0% of the theoretical value) to which no plasma treatment is applied is stuck to the film. Regarding example 7, an aluminum foil with a thickness of 20 μm serving as a metal foil is stuck to the film. Regarding example 8, a different type of plastic film or a fluororesin film (PTFE, for example) with a thickness of 100 μm is stuck to the film.

In sticking, each of the film and adherend is cut into a sample 25 cm square. The samples are laid one upon the other and then held between upper and lower hot plates both of which are heated at 140° C. using a hot press machine. The samples are then pressurized under the pressure of 10 MPa for 30 minutes and thereafter, a laminate is taken out to be self-cooled so that the temperature of the laminate drops to the room temperature. In this case, a surface treatment such as corona treatment is applied to a surface of the film or aluminum foil each serving as the adherend for the purpose of improvement in bond strength during the aforesaid sticking.

On the other hand, regarding comparative examples 1 to 6, the low-temperature plasma treatment is not carried out or is excessively carried out such that the biaxially oriented saturated polyester films of comparative examples 1 to 6 are outside the scope of the claims of the application. These films are biaxially oriented PET (or PEN) films each of which is 100 μm thick and have respective surface composition ratios X (O/C) excessively smaller or larger as compared with examples 1 to 9. In the biaxially oriented saturated polyester films of comparative examples 1 to 6, the surface composition ratios X are 95%, 102%, 122% and 98% of the theoretical value respectively, as shown in TABLE. Regarding each of comparative examples 1 to 3 and 6, each film and a film equivalent to each film are stuck together with the equivalent film serving as an adherend in the same manner as in examples 1 to 9. Regarding comparative example 4, an aluminum foil with a thickness of 20 μm serving as a metal foil is stuck to the film. Regarding comparative example 5, a fluororesin film with a thickness of 100 μm is stuck to the film.

The inventors conducted an experiment to examine a delaminating strength between the film and the adherend with respect to the aforesaid examples 1 to 9 and comparative examples 1 to 6. In the experiment, a 90-degree delaminating strength was measured using a tension (tensile tester). TABLE shows the results of the experiment. In the experiment, when a measured delaminating strength was not less than 10 g/cm, a film was determined to have a heat sealability. A film was determined to have no heat sealability when a measured separating force was less than 10 g/cm.

TABLE

| | Combination of laminate | | 90° delamination strength (g/cm) |
|---|---|---|---|
| | Film (O/C) *1 | Adherend (O/C) *1 | |
| Example 1 | Lumirror (+2.5) | Lumirror (+2.5) | 10 |
| Example 2 | Lumirror (+4.8) | Lumirror (+4.8) | 250 |
| Example 3 | Lumirror (+7.5) | Lumirror (+7.5) | 500 |
| Example 4 | Lumirror (+12.5) | Lumirror (+12.5) | Film broken (≦1000) |
| Example 5 | Lumirror (+20.0) | Lumirror (+20.0) | 20 |
| Example 6 | Lumirror (+12.5) | Lumirror (−5.0) | 100 |
| Example 7 | Lumirror (+12.5) | Al foil 20 μm thick | Film broken (≦1000) |
| Example 8 | Lumirror (+12.5) | Fluorine film 100 μm thick | 300 |
| Example 9 | Teonex (+5.0) | Teonex (+5.0) | 800 |
| Comparative Example 1 | Lumirror (−5.0) | Lumirror (−5.0) | 0 |
| Comparative Example 2 | Lumirror (+2.0) | Lumirror (+2.0) | 0 |
| Comparative Example 3 | Lumirror (+22.0) | Lumirror (+22.0) | 0 |
| Comparative Example 4 | Lumirror (−5.0) | Al foil 20 μm thick | 0 |
| Comparative Example 5 | Lumirror (−5.0) | Fluorine film 100 μm thick | 0 |
| Comparative Example 6 | Teonex (−2.0) | Teonex (−2.0) | 0 |

*1 where parenthesized numeral represents an increase or decrease in % relative to the theoretical value of ratio O/C.

As obvious from the experimental results, it is understood that the surface composition ratio X (O/C) is larger than the theoretical value in a range from 2.5% to 20%, that is, the films (laminates) of examples 1 to 9 which are in a range from 102.5% to 120% relative to the theoretical value are bonded to the same type of film, aluminum foil and fluororesin film and have desirable heat sealability. On the other hand, the surface composition ratio X (O/C) is less than 102.5% or exceeds 120% relative to the theoretical value in the films (laminate) of comparative examples 1 to 6. The films of comparative examples 1 to 6 can achieve no heat sealability.

In the foregoing embodiment, the hot press machine is used to heat-seal the film and adherend. However, a hot roll may be used for the heat seal, instead. Furthermore, hot air may also be used for the heat seal. In this case, the heating temperature should not be limited to 140° C. but may range from 100° C. to 200° C. Furthermore, three or more layers of films or three or more different types of films may be stuck together, instead of two sheets of films. For example, when a number of same type of films are stuck together, a thick PET plate having a sufficient heat resistance and large physical strength can be obtained. For example, a plate with a thickness of 1.0 mm can be obtained by sticking ten sheets of PET films each of which is 100 μm thick.

The low-temperature plasma treatment may be applied to both sides of the film. Furthermore, the thicknesses of the film and adherend -should not be limited to those described above. Additionally, the different type of plastic film should not be limited to the fluororesin film but various types of films may be used, instead. The film of the present invention may be stuck to an adherend (a different type of material) such as a plate-shaped glass or ceramics by heat-seal.

The foregoing description and drawings are merely illustrative of the principles of the present invention and are not to be construed in a limiting sense. Various changes and modifications will become apparent to those of ordinary skill in the art. All such changes and modification are seen to fall within the scope of the appended claims as defined by the appended claims.

We claim:

1. A biaxially oriented saturated polyester film made by a biaxial orientation method, comprising a heat-seal side provided on at least one of two sides thereof, said heat-seal side being made by applying a plasma treatment to a film surface so that the film surface has a composition ratio of the number of oxygen atoms to the number of carbon atoms, the composition ratio being not less than 105% and not more than 115% of a theoretical value and so that said heat-seal side is heat sealable at a heating temperature ranging from 100° C. to 200° C.

2. A laminate comprising:
a plurality of sheets of biaxially oriented saturated polyester films each having a film surface to which a plasma treatment is applied so that the film surface has a composition ratio of the number of oxygen atoms to the number of carbon atoms, the composition ratio being not less than 105% and not more than 115% of a theoretical value and so that each biaxially oriented saturated polyester film is heat sealable at a heating temperature ranging from 100° C. to 200° C., said sheets of biaxially oriented saturated polyester films being stuck on each other by heat seal.

* * * * *